ing onto the fibrous surfaces. This coating is hydrophilic
3,695,937
BATTERY SEPARATORS John J. Rowlette, Arcadia, Calif., assignor to Hughes Aircraft Company, Culver City, Calif.
Filed Mar. 9, 1970, Ser. No. 17,683
Int. Cl. H01m 3/02
U.S. Cl. 136—146      8 Claims

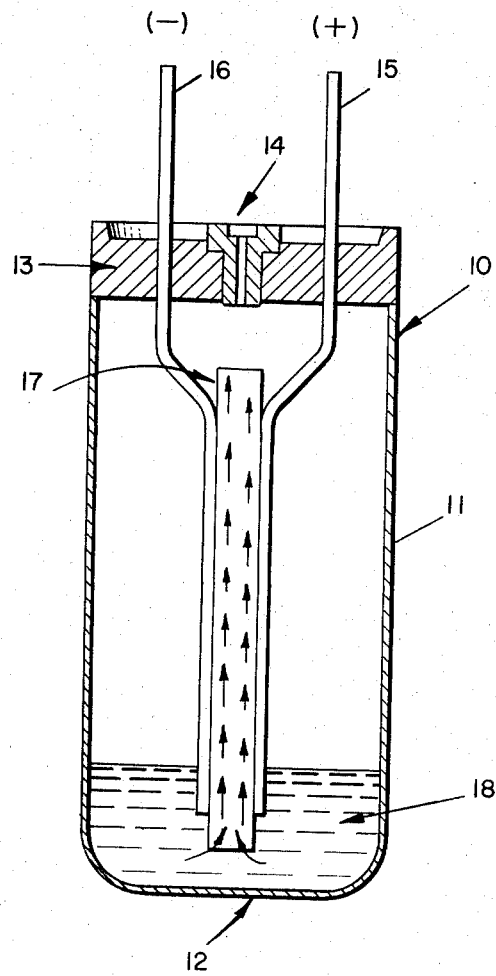

ABSTRACT OF THE DISCLOSURE

Improved battery separator of hydrophobic synthetic fibers having a black manganese dioxide hydrophilic coating, method of prefabrication and improved batteries provided therewith.

BACKGROUND OF THE INVENTION

Field of the invention

Battery separators are used in both batteries and fuel cells to insulate negative and positive electrodes and to act as a reservoir for liquid electrolyte.

Description of the known art

It is common practice to include a wetting agent with synthetic fiber separator material. Another method which has been used for synthetic felt is to etch the surface of the fibers thereof with a sulfuric acid, potassium dichromate solution to improve their wetting property. Otherwise, the hydrophobic character of such material as polypropylene, nylon (polyamide material) Teflon (tetrafluoroethylene material) and similar synthetic fibrous material in combination with the wetting agents have limited their use and leads to anomalous behavior and reduced performance.

SUMMARY OF THE INVENTION

The invention relates to the method of rendering battery separator material of normally porous structure of hydrophobic synthetic base, for example, polypropylene, nylon, Teflon, and the like hydrophilic, the products thereof and improved battery and fuel cell structure utilizing the same. More particularly, the method relates to the treatment of synthetic hydrophobic battery separator material of synthetic porous mass, for example, felted polypropylene, nylon, Teflon and the like, in an acidified potassium permanganate solution and depositing onto the mass of exposed and fibrous surfaces a relatively permanent black coating of inert manganese dioxide prior to application and use in batteries and fuel cells.

BRIEF DESCRIPTION OF THE DRAWING

The drawing is illustrative of a battery containing the herein pretreated plate separator and electrolyte.

DESCRIPTION OF THE PREFERRED EMBODIMENT

In the present invention a fibrous matt or woven mass of synthetic fibers, preferably polypropylene felt, is rendered hydrophilic by treatment in an acidified potassium permanganate solution. As the fibers are oxidized by the permanganate, its reduction product, manganese dioxide, is deposited as a relatively black permanent coating onto the fibrous surfaces. This coating is hydrophilic and very inert chemically, as battery and fuel cell separator material.

An example of the solution and treatment is provided as follows:

$H_2O$ ------------------------------------------ml-- 200
$KMnO_4$ ----------------------------------------gm-- 15
$H_2SO_4$ (96%) ---------------------------------ml-- 6

A fibrous felt matt of polypropylene material to be treated was placed in the solution for a period of about 5 minutes at an optimum temperature of 90° C. This treatment may vary somewhat with respect to relative concentrations and time and temperature dependent upon the material treated and the amount of deposit desired by the operator. When removed, washed and dried a black manganese dioxide coating is firmly adhered to the fiber surfaces.

As an alternative separator structure, for example, a fibrous Nylon mass was treated in the above solution composition for about 5 minutes at less than 60° C. which has been found to be almost too hot. Better results were obtained by treating nylon at 20°–40° C. From a visual inspection, it appeared that the rate of reaction on Nylon at 20° C. is about the same as that on polypropylene at 90° C. In view of the above, other hydrophobic porous synthetic structure in porous, woven, matt, or compressed fabric forms may be coated with $MnO_2$, as in the above treatment. Some variation in solution concentrations, judgment of temperatures, and duration of treatment, which are particularly applicable to the particular plastic battery separator material, must be taken.

An additional separator structure which is capable of treatment in this manner is Teflon. Good results have been achieved at temperatures between 86° C. and 95° C., and for times of 5 minutes to 30 minutes, depending upon the depth of coating required.

As demonstrated in the figure, there is illustrated a conventional form of liquid container cell 10 provided with side walls 11, base 12, top covering 13, fluid inlet 14, and end closure means (not shown). Mounted through the top 13 are one or more of a series of conventional positive and negative poles, or terminals 15 and 16 respectively, connected to a series of battery plates separated by a hydrophobic synthetic fibrous matt pretreated as herein provided. The treated synthetic fibrous material is also applicable to fuel cell structure.

For example, inserted between the poles 15 and 16 is a prefabricated fibrous matt 17 of polypropylene treated as above described. The battery in application and use contains a conventional electrolyte 18 with no free wetting agent. The improvement provided is in greater overall effectiveness as exemplified by the following:

EXAMPLE 1

In order to test the effectiveness of the treatment, a test was set up in which a strip of untreated polypropylene felt and a similar strip of the treated felt were immersed, at room temperature, ¼" into a beaker of 32 percent KOH solution. The wicking ability of the strips was then inferred from the rate of ascent of the solution. Table I shows the results of the wicking test.

TABLE I.—COMPARISON BETWEEN TREATED AND UNTREATED POLYPROPYLENE FELT

| Time, mins. | Height (treated), inch | Height (untreated), inch |
|---|---|---|
| 1 | 0.9 | 0.9 |
| 5 | 3.0 | 2.0 |
| 10 | 5.3 | 2.2 |
| 30 | 5.3 | 2.2 |
| 60 | 5.3 | 2.2 |

EXAMPLE 2

In order to compare $MnO_2$ felt pretreatment with two commercially available treated polypropylene felts, the following test was devised:

Sample strips ¾" wide x 2½" long with indicator marks at 1", 1½", and 2" were suspended horizontally across the mouth of a small beaker. One drop of 32 percent KOH solution was placed at one end and the time to reach the indicator marks was measured. Table II gives the results.

TABLE II.—COMPARISONS BETWEEN HEREIN TREATED FELT AND TWO COMMERCIALLY TREATED FELTS X AND Y

| Distance | Herein, secs. | X, secs. | Y [1] |
|---|---|---|---|
| 1" | 28 | 42 | — |
| 1½" | 88 | 360 | — |
| 2" | 360 | — | — |

[1] Not hydrophilic, except with pure water.

NOTE.—Spaces marked — mean never.

EXAMPLE 3

Finally, samples of the herein treated and commercially available felts were placed in a 32 percent KOH solution at 105° C. for 45 minutes, in order to test their resistance to heat and to act as an accelerated life test. After this treatment, the three samples were tested as before. Table III shows the results of the tests.

TABLE III.—COMPARISON OF FELTS AFTER THERMAL TREATMENT

| Distance | Herein, secs. | X [1] | Y [1] |
|---|---|---|---|
| 1" | 200 | — | — |
| 1½" | — | — | — |
| 2" | — | — | — |

[1] No evidence of any hydrophilic character. See Note at end of Table II.

The synthetic plastic battery separator structure is preferably in prefabricated porous mass form or felt, which may have either continuous or noncontinuous fibers, and treated as a prefabricated mass body.

Having described and illustrated the present embodiment of this invention, improvement and/or discovery in the art in accordance with the patent statutes, it will be apparent that some modifications and variations including mixture of the embodied components, as described, may be made without departing from the spirit and scope thereof. The specific embodiments described are given by way of examples illustrative of the changes and improvement discovered applicable herein and which are to be construed or limited only by the terms of the appended claims.

What is claimed is:

1. The method of preparing a prefabricated synthetic hydrophobic plastic base of battery plate separator material and obtaining a prefabricated black appearing manganese dioxide coating thereover comprising the steps of:
   (A) preparing a treating solution of acidified potassium permanganate in the relative ratio of substantially;

(1) $H_2O$ _____ml__ 200
   (2) $KMnO_4$ _____gm__ 15
   (3) $H_2SO_4$ (96%) _____ml__ 6

(B) placing said battery separator material in said solution;
   (C) heating said solution to a temperature of from about 20° C. to about 95° C. for a period of about 5 minutes to about 30 minutes;
   (D) removing said battery separator material from said treating solution, and
   (E) recovering a battery separator material having a black coating of hydrophilic manganese dioxide overlying the treated surface thereof.

2. The method of claim 1 wherein the synthetic plastic base is a synthetic hydrophobic fibrous material selected from the group consisting of polypropylene fiber, polyamide fibers, and tetrafluoroethylene fibers, and mixtures of the same.

3. The method of claim 1 wherein the battery separator material is fibrous polypropylene and the temperature of treatment is on the order of 90° C.

4. The method of claim 1 wherein the battery separator material is fibrous polyamide material and the temperature of treatment is between about 20° C.–40° C.

5. The method of claim 1 wherein the battery separator material is fibrous tetrafluoroethylene material and the temperature of treatment is about 86° C. to about 95° C. for a period of about 5 minutes to about 30 minutes.

6. The method of preparing a porous body of battery separator material of hydrophobic synthetic fibrous plastic with a hydrophilic manganese dioxide coating thereon, the steps consisting of:
   (A) preparing a treating solution of acidified potassium permanganate in the approximate ratio of;

(1) $H_2O$ _____ml__ 200
   (2) $KMnO_4$ _____gm__ 15
   (3) $H_2SO_4$ (96%) _____ml__ 6

(B) placing said body of battery separator material in said solution;
   (C) heating said solution and effecting thereby a deposit of hydrophilic manganese dioxide on the surfaces of said porous body;
   (D) removing, washing and drying, said porous body; and
   (E) obtaining a battery separator material having a hydrophilic blackish coating of manganese dioxide thereon.

7. A battery separator material consisting of hydrophobic synthetic fibers having a black coating thereon of manganese dioxide.

8. A battery structure having positive and negative electrodes separated by a mat of synthetic hydrophobic fibrous battery plate separator material installed in prefabricated combination with a relatively permanent blackish deposit of manganese dioxide contained thereon.

References Cited
UNITED STATES PATENTS

| | | | |
|---|---|---|---|
| 3,317,330 | 5/1967 | Livingston et al. | 117—138.8 E |
| 3,472,700 | 10/1969 | Kollman et al. | 136—148 |
| 3,188,258 | 6/1965 | Young | 117—138.8 E |
| 3,236,695 | 2/1966 | Horowitz | 136—148 |
| 3,379,573 | 4/1968 | Gershberg | 136—146 |

DONALD L. WALTON, Primary Examiner

U.S. Cl. X.R.

117—138.8 E; 136—148